United States Patent [19]
Bailey et al.

[11] Patent Number: 5,878,865
[45] Date of Patent: Mar. 9, 1999

[54] VARIABLE SPEED CONVEYING APPARATUS

[75] Inventors: Thomas William Bailey; Jeffrey John Patchett; James Robert Stembridge, all of Science Park, Great Britain

[73] Assignee: Molins PLC, Bucks, Great Britain

[21] Appl. No.: 693,289

[22] PCT Filed: Feb. 13, 1995

[86] PCT No.: PCT/GB95/00291

§ 371 Date: Aug. 15, 1996

§ 102(e) Date: Aug. 15, 1996

[87] PCT Pub. No.: WO95/21546

PCT Pub. Date: Aug. 17, 1995

[30] Foreign Application Priority Data

Feb. 15, 1994 [GB] United Kingdom .................... 9402888
Jul. 15, 1994 [GB] United Kingdom .................... 9414384

[51] Int. Cl.⁶ .................................................. B65G 47/26
[52] U.S. Cl. ...................... 198/459.8; 198/459.11
[58] Field of Search .............................. 198/334, 459.1, 198/459.4, 460.2, 459.8

[56] References Cited

U.S. PATENT DOCUMENTS

| 3,232,414 | 2/1966 | Brigham et al. | 198/459.8 X |
| 3,292,769 | 12/1966 | Zuppiger . | |
| 3,903,806 | 9/1975 | Ayres et al. | 198/334 X |
| 3,939,959 | 2/1976 | Dunstan et al. . | |
| 4,066,161 | 1/1978 | Michalon et al. | 198/334 |
| 4,072,228 | 2/1978 | Honeggel et al. | 198/459.8 |
| 4,227,606 | 10/1980 | Bogatzki | 198/459.8 |
| 4,284,191 | 8/1981 | LaVau | 198/334 X |

FOREIGN PATENT DOCUMENTS

| 397999 | 2/1966 | Switzerland . | |
| 732189 | 5/1980 | U.S.S.R. | 198/443 |
| 2162810 | 2/1986 | United Kingdom . | |
| 2175268 | 11/1986 | United Kingdom . | |

*Primary Examiner*—James R. Bidwell
*Attorney, Agent, or Firm*—Antonelli, Terry, Stout & Kraus, LLP

[57] ABSTRACT

Variable speed conveying apparatus includes a conveyor (16) having a plurality of conveying surfaces (18) for engaging a stream (10) of articles along a path, and elements for progressively changing the speed of the surfaces as they progress along the path. The conveyor may include a series of pivotally interconnected links (18), the angular disposition of the links being controlled as they move along the path. Typically the conveyor may be used for changing the height of a multi-layer stream of rod-like articles such as cigarettes. Similar conveyor arrangements may be used to convey articles or people by providing slats (322,324) carried by conveyor links (318) or by providing independently-controllable carrier members (218) movable on an endless track (236).

18 Claims, 4 Drawing Sheets

5,878,865

VARIABLE SPEED CONVEYING APPARATUS

BACKGROUND OF THE INVENTION

This invention relates to variable speed conveying apparatus. In one form the invention is concerned with conveying rod-like articles, particularly articles of the tobacco industry such as cigarettes.

Cigarette packing machines generally assemble cigarettes in groups prior to forming a packet around each group. The groups of cigarettes usually comprise two or three rows of cigarettes. Cigarettes are commonly transferred to the packing machine in a multi-layer stream, often having a depth corresponding to ten cigarettes or more. Conventional cigarette packing machine hoppers are capable of receiving such a stream and providing an output of one or more rows of cigarettes or forming a group suitable for packing. Such hoppers operate intermittently, however, and can be a source of damage and/or is degradation to cigarettes. British patent specification No. 2175268A discloses one form of apparatus for continuously converting a multi-layer stream of cigarettes into a single row stream from which groups for use in a packing machine may be obtained: this apparatus may also be damaging to cigarettes, however, because the stream tends to be squeezed between narrowing side walls.

SUMMARY OF THE INVENTION

According to one aspect of the present invention conveying apparatus, particularly for changing the height of a stream of rod-like articles moving in a direction transverse to the lengths of the articles, comprises conveyor means having a plurality of conveying surfaces for engaging the stream along a path, and means for progressively changing the speed of said surfaces as they progress along said path. The stream may be a multi-layer stream and the speed changing means may be arranged to increase the speed of the conveyor surfaces: in this form the apparatus may be used to reduce the height of a multi-layer stream prior to delivery to a cigarette packing machine. Alternatively or additionally the speed changing means may be arranged to decrease the speed of the conveyor surfaces: the apparatus may then be used to increase the height of a stream, including a single row stream, so that the apparatus can be used as a stack former.

In a preferred arrangement said conveying surfaces are interconnected and may form part of an endless conveyor. Preferably the speed changing means comprises means for controlling the relative rate of movement of said surfaces along said path. Preferably said controlling means also controls, directly or indirectly, the relative positions of said surfaces. Thus, each surface may form part of a link of a link conveyor, the angular disposition of the links being controlled along the path. Where the conveyor means comprises an endless conveyor passing around upstream and downstream pulleys, the latter is preferably driven at a higher speed than the former when it is desired to reduce the height of the stream and at a lower speed when it is desired to increase the height of the stream. Preferably the controlling means includes means extending longitudinally adjacent said path.

According to a further aspect of the invention conveying apparatus, particularly for changing the height of a stream of rod-like articles moving in a direction transverse to the lengths of the articles, comprises endless conveyor means including a series of pivotally interconnected links, and means for controlling the relative disposition of the links along a path of the conveyor, so that the longitudinal spacing between corresponding parts of adjacent links progressively changes as the links progress along said path. In a preferred arrangement the controlling means controls the angular disposition of the links as they progress along the path, preferably so that in at least a portion of said path the links are relatively angularly disposed in such manner that articles may settle in recesses formed by adjacent surfaces of said links. The controlling means preferably includes drive means for said conveyor means: in one preferred arrangement the controlling means comprises a scroll member rotatable about an axis extending substantially parallel to said path.

In another form the invention is concerned with conveying apparatus capable of conveying articles generally (i.e. including but not limited to rod-like articles) or people (i.e. as on a travelator). For convenience reference will be made hereinafter to conveying articles without, however, any intention to exclude the possibility of conveying animate articles such as people. According to a still further aspect of the invention conveying apparatus includes a series of conveying surfaces, means for conveying said surfaces along a path, and means for controlling relative position of said surfaces on said path so as to accelerate or decelerate articles conveyed on said paths. Thus said surfaces may comprise slats capable of relative overlapping, which may, for example, be pivotally connected to links of a link conveyor where drive is controlled as described herein above. Alternatively each surface may be independently movable along a path (which is preferably endless), e.g. by being carried by a movable member whose position is controlled by a motor, which may be carried by the member itself or maybe stationary (e.g. a linear induction or stepper motor).

BRIEF DESCRIPTION OF THE DRAWINGS

The invention will be further described, by way of example only, with reference to the accompanying diagrammatic drawings, in which.

DETAILED DESCRIPTION OF THE EMBODIMENTS

Figure 1:
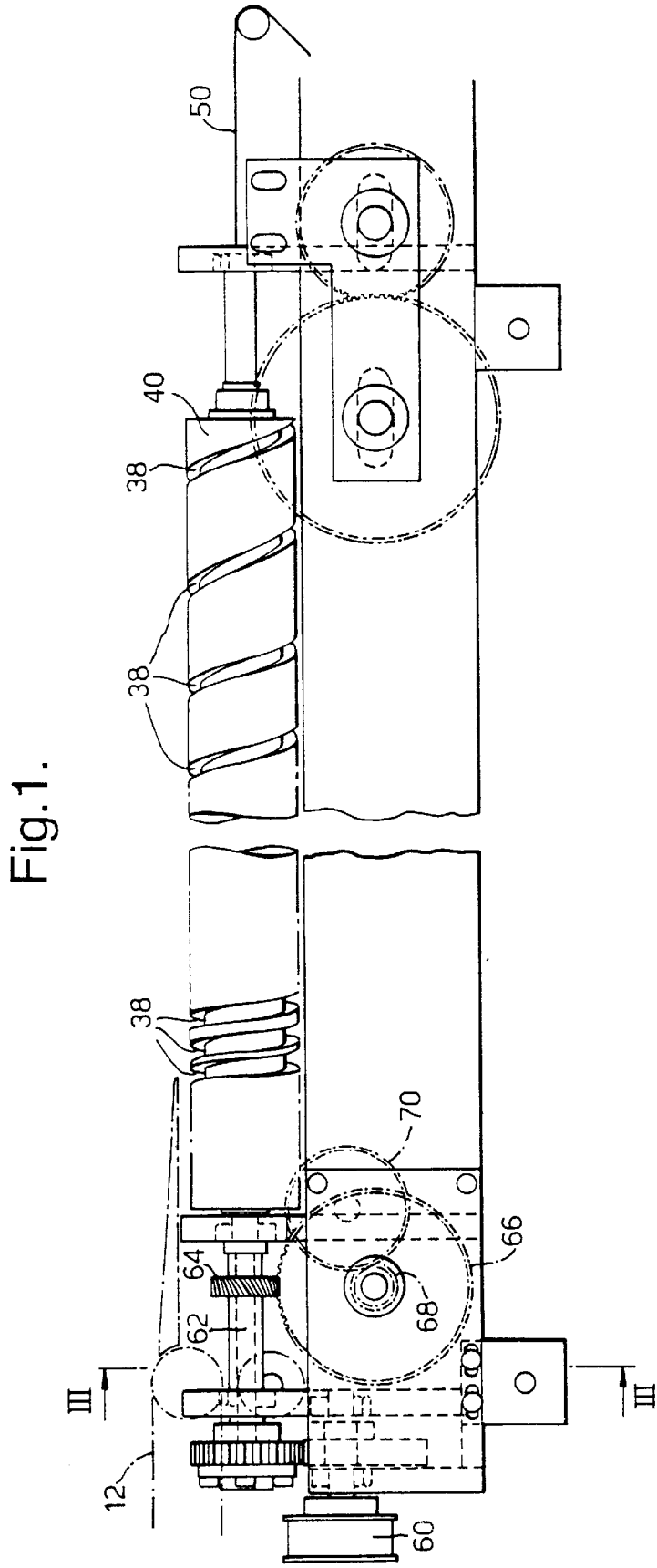
FIG. 1 is a side view of part of a cigarette conveying apparatus.
Figure 2:
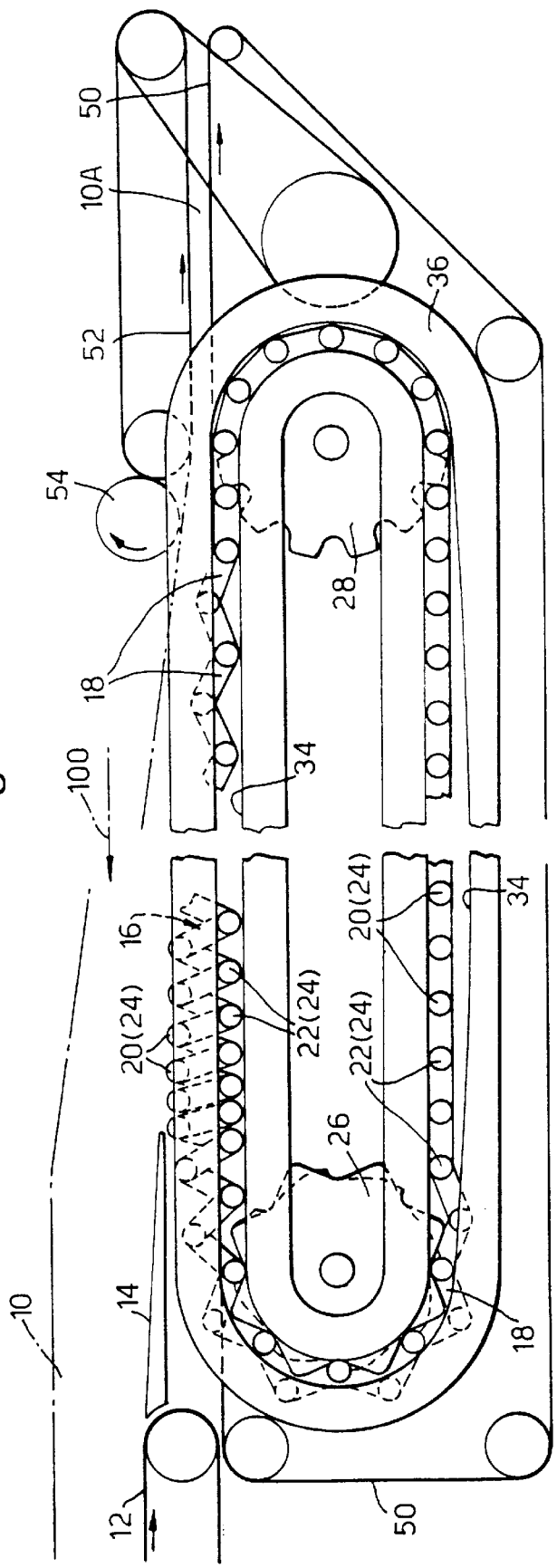
FIG. 2 is a further side view of the apparatus of FIG. 1, with certain parts omitted and showing further details.

Referring particularly to FIGS. 1 and 2, a multi-layer stream 10 of cigarettes is delivered to the apparatus by way of an endless band conveyor 12. The stream is typically about ten cigarettes in depth and may be delivered from a filter cigarette making machine, either directly or from a cigarette reservoir. As will be explained hereinafter, the stream 10 is conveyed by the apparatus and progressively reduced in height so that the stream 10A delivered from the apparatus is typically two cigarettes deep.

Figure 3:
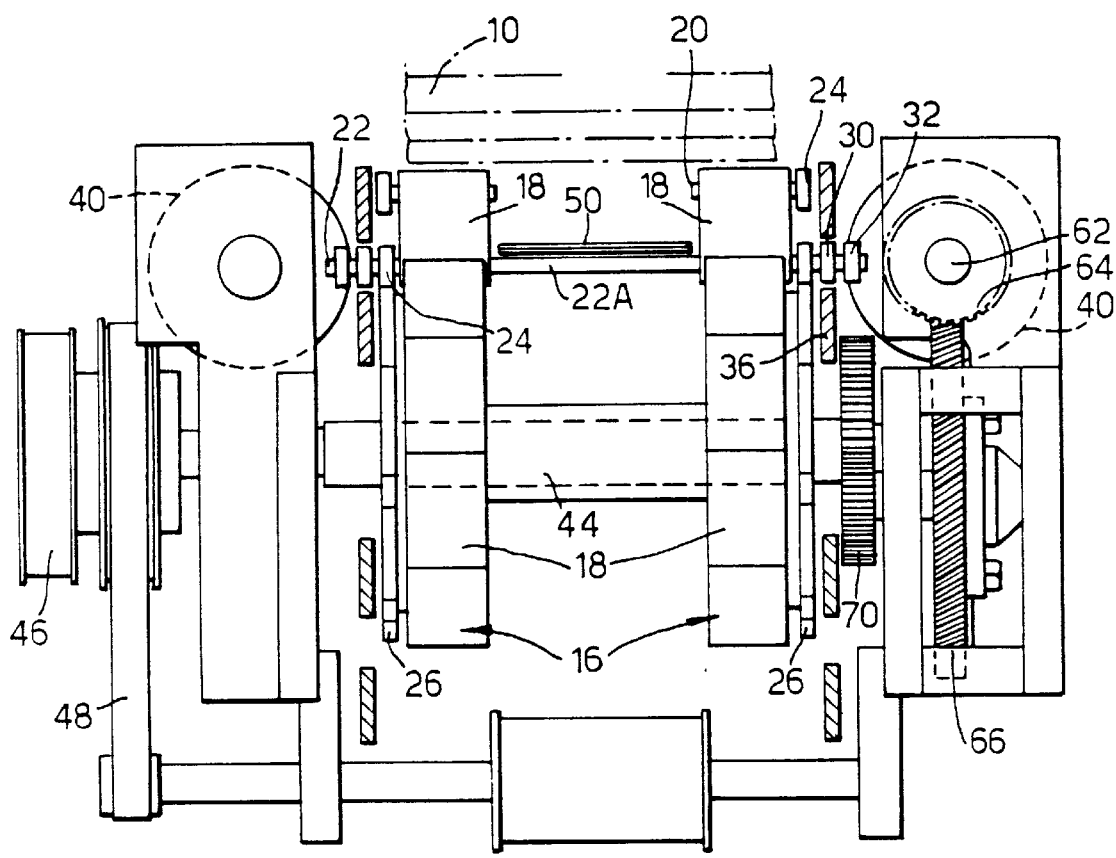
FIG. 3 is a sectional view on the line III—III in FIG. 1.

The stream 10 passes from the end of the conveyor 12 onto an inclined stationary plate 14 having a low friction surface and from there onto a link conveyor 16. As shown in FIG. 3, the link conveyor 16 comprises laterally-spaced parts which support the stream 10 of cigarettes. Each of the laterally-spaced parts is substantially the same in construction and operation and comprises links 18, generally formed from a plastics material such as nylon, each link being connected to its neighbour by a first pivot 20 at one end and a second pivot 22 at the other end. The pivots 20 are relatively short and serve simply to pivotally connect the links 18 together: the pivots 22 serve also to control the positions of the links and, unlike the pivots 20, each comprise a single rod 22A extending between the laterally-spaced parts of the conveyor 16.

At its outer end each pivot 20 carries a stud 24 which is engageable with drive sprockets 26, 28 at each end of the conveyor 16. The pivots 22 also carry studs 24 engageable with the sprockets 26, 28: they also extend outwards beyond the studs 24 and carry two further axially-spaced studs 30, 32. The studs 30 are movable in a channel 34 formed in a stationary side plate 36. The studs 32 are engaged in a helical grove 38 extending around a cylindrical scroll member 40 arranged with its longitudinal axis parallel to the upper run of conveyor 16. The pitch of the helical groove 38 progressively increases along the length of the scroll member 40, in the direction of movement of the conveyor 16.

A belt drive from a motor (not shown) rotates an input pulley 60 connected by way of gearing to a drive shaft 62 for one of the scroll members 40. Further gears 64, 66 and 68, 70 transmit drive to a drive shaft 44 for the sprockets 26. A belt drive 46 transmits drive from the shaft 44 to the sprockets 28: typically these rotate about one third faster than the sprockets 26. A further belt drive (not shown) transmits drive to the other scroll member 40. The gear arrangement 64–70 could be replaced by a belt drive and reduction gear box.

An endless conveyor band 50 extends between the laterally-spaced parts of the link conveyor 16 and takes over conveyance of the stream 10 at the end of the link conveyor. An endless upper band 52 is arranged above the belt 50 beyond the end of the link conveyor 16. A refuser roller 54 is placed adjacent the upstream end of the band 52. A belt drive 48 (FIG. 3) for the band 50 is taken from the drive shaft 44.

In operation, rotation of the scroll members 40 controls longitudinal spacing of the studs 32 on the upper run of the conveyor 16 by virtue of their engagement with the helical grooves 38, the arrangement being such that the studs 32 become progressively spaced further apart. Hence the relative angular disposition of the links 18 progressively varies along the upper run, as indicated in FIG. 2. It will be appreciated therefore that the longitudinal speed of the links 18 progressively increases according to the relative spacing between the pivots 22, and a consequence of this is that the stream 10 of the cigarettes arriving on the conveyor 16 from the end of the stationary plate 14 is itself progressively accelerated. The height of the stream 10 is correspondingly reduced as the stream is conveyed by the link conveyor 16. Note that the angular disposition of the links 18 assists in providing engagement for the stream 10, cigarettes settling into the V-shaped grooves between the links 18. In the region of the sprocket 28 the stream 10 (10A) is transferred to the band 50. Note also that the scroll members 40 assist drive of the conveyor 16, in particular assisting in overcoming cumulative friction forces resisting alteration of the disposition of the links which otherwise could become excessive if drive was confined to the end pulleys.

The stream 10A is conveyed between the bands 50 and 52 to apparatus forming part of an arrangement for assembling groups of cigarettes for insertion into packets. The construction and operation of this apparatus or of an associated packing machine forms no part of this invention.

Although the present apparatus has been described with reference to conveyance of a stream 10 having a depth of about ten cigarettes so as to convert it to a stream 10A having a depth of about two cigarettes, similar apparatus is capable of performing differing reductions in the height of the stream. In particular, the apparatus could be used to reduce a multi-layer stream to a single row stream.

The apparatus shown in FIGS. 1 to 3 may be operated in reverse, so as to convey cigarettes in the direction indicated by arrow 100 in FIG. 2. In this mode the apparatus may comprise a stack former: the stream of cigarettes 10A may be one or two cigarettes deep and a multi-layer stream, e.g. up to 10 cigarettes deep, is progressively formed on the link conveyor 16 and delivered to the conveyor 12.

It will be understood that with a scroll drive such as provided by the scroll members 40 there is a maximum angle which the helical groove 38 can make with a plane at right angles to the longitudinal axis of the member beyond which the scroll becomes practically unusable. Typically that angle is about 35°. The consequence of this is that any single conveyor such as the link conveyor 16 can only provide a limited velocity ratio (typically a maximum of about 5 to 1). In order to provide greater velocity ratios similar link conveyors driven by separate scroll drive members may be arranged in series.

Figure 4:
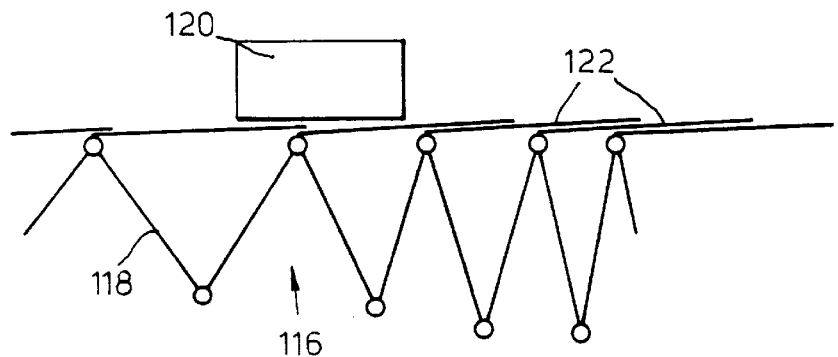
FIG. 4 is a side view of part of another conveying apparatus.

FIG. 4 shows part of an article conveyor 116 which is basically similar to the conveyor 16 in construction and operation but is adapted for carrying articles 120 such as packages by the addition of overlapping slats 122 for supporting the articles. The slats 122 are pivoted to the links 118 of the conveyor 116 and provide a substantially continuous support surface for the conveyed articles 120. As shown in FIG. 4 the slats 122 overlap by a greater amount where the links 118 are relatively closely spaced.

The conveyor 116 could be driven in either direction and could be reversible. Articles 120 received at one end of the conveyor 116 are progressively accelerated (or decelerated) and the spacing of successive articles is correspondingly increased (or decreased) during conveyance. One conveyor 116 driven in a direction so as to decelerate conveyed articles 120 could be used to slow the articles upstream of a processing or inspection position with a similar conveyor downstream of the position arranged to accelerate the articles up to their former speed.

Another example of possible use for the conveyor 116 is as a moving walkway or travelator, e.g. as used in some airports. One disadvantage of current walkways is that because they travel at constant speed this speed is limited by the ability of people to safely get on and off the conveyor. By providing one or more conveyors similar to the conveyor 116 at each end of the moving walkway it is possible to accelerate to and decelerate from a relatively high speed moving walkway. Similar conveyors could be used at the top and bottom of escalators, so as to allow the latter to safely move more rapidly.

Figure 5:
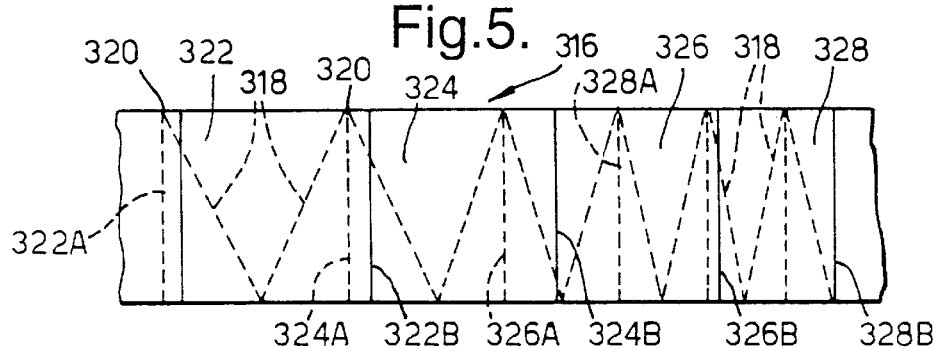
FIG. 5 is a plan view of part of further conveying apparatus.

When used for conveying articles or as a travelator drive pulleys for the conveyor 116 could be mounted with their axes vertical with substantially horizontal slats carried on their ends. This arrangement is illustrated in FIG. 5 wherein link conveyor 316 has links 318 with overlapping slats 322, 324, 326, 328 etc. carried at the ends of the links, the leading end 322A, 324A etc. of each slat being attached to one of the pivot axes 320 of the conveyor. The leading end 322A etc.

of each slat 322 etc. is overlapped by the trailing end 322B of the adjacent slat to the left as viewed in FIG. 5.

Figure 6:
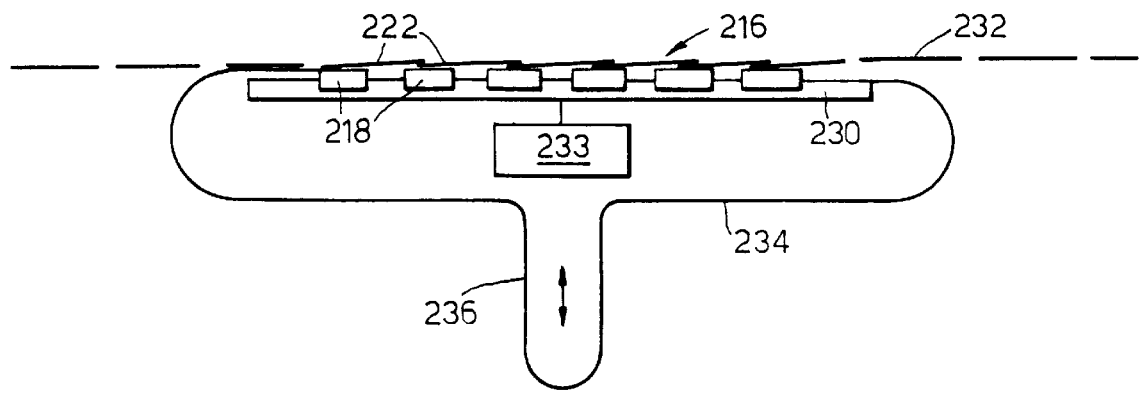
FIG. 6 is a side of part of still further conveying apparatus.

The rate of advance of the conveyors 16 and 116 is determined by the pitch of the respective scroll members, which although variable is predetermined along the length of the conveyor. More generally, as shown in FIG. 6, a variable speed conveyor 216 may comprise a series of members 218 each carrying overlapping slats 222 and being movable on an operative run along a track 230 forming part of a conveying path 232 (for articles or people). The position of each member 218 is controllable independently of its neighbour. In this way the conveyor 216 can be controlled so as to accelerate or decelerate articles along its operative length, and could, if desired, simultaneously accelerate articles along part of its length and decelerate articles along another part of its length. The members 218 may be slidable relative to the track 230 and be controlled by a series of induction motors or linear stepper motors in the track. Alternatively, each member 218 could contain its own powered servo motor. In either case control of the respective motors would be by software, e.g. running in a microprocessor 233. Each member 218 is allowed to move only a certain distance away from its neighbour, limited by the length of the overlapping slats 222. The members 218 may but need not be physically connected but preferably are movable on an endless path 234. The length of the return part of the endless path may be variable, e.g. as indicated at 236, to accommodate different numbers of members 218 according to the number of such members in use on the track 230.

We claim:

1. Conveying apparatus for conveying rod-like articles moving in a direction transverse to the lengths of the articles as a continuous stream of articles, comprising a first conveyor for delivering articles in a continuous stream having a first height, a second conveyor for receiving articles in a continuous stream having a second height, and conveyor means for conveying articles continuously along a path extending between said first and second conveyors, so that the height of the stream of articles being conveyed on said path changes along its length, wherein said conveyor means has a plurality of conveying surfaces forming an endless conveyor for engaging the stream along said path, drive means for moving the endless conveyor along said path to convey said articles and controlling means for progressively changing the speed of said conveying surfaces as they progress along said path by independently controlling the relative rate of movement of said conveying surfaces along said path as said endless conveyor is being driven by said drive means, said controlling means including spacing control means extending longitudinally adjacent said path and having a member which is rotatable about an axis extending generally parallel to said path, and carrying engagement means which, on rotation of said member about said axis, causes said conveying surfaces to be relatively displaced.

2. Apparatus as claimed in claim 1, including means for driving said first and second conveyors at different speeds.

3. Apparatus as claimed in claim 1, wherein each conveying surface is carried by a link of a link conveyor, the angular disposition of the links being controlled by said controlling means along said path.

4. Apparatus as claimed in claim 3, wherein each conveying surface comprises part of said link.

5. Apparatus as claimed in claims 1 or 3, wherein said conveying surfaces are carried by members capable of overlapping one another.

6. Apparatus as claimed in claim 1, wherein said controlling means controls the relative positions of said conveying surfaces.

7. Apparatus as claimed in claim 1, wherein the endless conveyor passes around upstream and downstream pulleys, the downstream pulley being driven at a higher speed than the upstream pulley when it is desired to reduce the height of a stream on said path and at a lower speed when it is desired to increase the height of the stream.

8. Apparatus as claimed in claim 1, wherein the conveyor means includes a series of pivotally interconnected links, said spacing control means including means for determining the relative disposition of the links along a path of the conveyor, so that the longitudinal spacing between corresponding parts of adjacent links progressively changes as the links progress along said path.

9. Apparatus as claimed in claim 8, wherein the determining means is arranged to control the angular disposition of the links as they progress along the path.

10. Apparatus as claimed in claim 9, wherein, on at least a portion of said path, the links are relatively angularly disposed so that said conveying surfaces are angularly disposed and define recesses between adjacent conveying surfaces such that articles may settle in said recesses.

11. Apparatus as claimed in claim 8 or 9, including a series of partially overlapping slats connected to said links so as to present a relatively flat conveying surface.

12. Conveying apparatus including a series of conveying surfaces forming an endless conveyor for conveying articles along a path, means for driving said endless conveyor to convey articles along said path, and means for independently controlling the relative position of said conveying surfaces on said path as said endless conveyor is being driven by said driving means so as to accelerate and decelerate articles conveyed on said path, wherein said conveying surfaces of said endless conveyor are formed on slats, said slats being capable of overlapping so as to present a relatively even conveying surface for conveyed articles within a range of possible relative positions of adjacent slats, said controlling means including spacing control means extending longitudinally adjacent said path and having a member which is rotatable about an axis extending generally parallel to said path, and carrying engagement means which, on rotation of said member about said axis, causes said surfaces to be relatively displaced, and means for rotating said member.

13. Apparatus as claimed in claim 12, wherein said slats are carried by an endless conveyor including a series of pivotally interconnected links.

14. Apparatus as claimed in claim 11, wherein said slats are carried with said surfaces substantially transverse to the pivot axes of said links.

15. Apparatus as claimed in claim 12, wherein each conveying surface is independently movable along said path and said controlling means comprises independently-controllable drive means for said conveying surfaces.

16. Apparatus as claimed in claim 12, wherein said rotatable means comprises drive means for advancing said conveying surfaces along said path.

17. Apparatus as claimed in claim 1 or 12, wherein said rotatable member comprises a cylindrical member and the engagement means follows a variable pitch helix around said member.

18. Conveying apparatus for conveying rod-like articles moving in a direction transverse to the lengths of the articles as a continuous stream of articles, comprising a first conveyor for delivering articles in a continuous stream having a first height, a second conveyor for receiving articles in a continuous stream having a second height, and conveyor means for conveying articles continuously along a path extending between said first and second conveyors, so that the height of the stream of articles being conveyed on said path changes along its length, wherein said conveyor means has a plurality of conveying surfaces forming an endless conveyor for engaging the stream along said path, drive means for moving the endless conveyor along said path to convey said articles and controlling means for progressively changing the speed of said conveying surfaces as they progress along said path by controlling the relative rate of movement of said conveying surfaces independent of said drive means, said controlling means including spacing control means extending longitudinally adjacent said path and having a pair of parallel cooperating laterally-spaced rotatable members which are each rotatable about an axis extending generally parallel to said path, one on each side of said path of said endless conveyor, and carrying engagement means which, on rotation of said rotatable members, causes said conveying surfaces to be relatively displaced, said endless conveyor having means extending laterally therefrom for engaging with respective carrying engagement means of said rotatable members and for guiding said endless conveyor, including a first engagement member for engaging with the carrying engagement means and a second engagement member for engaging with guide means defining a further path for the endless conveyor.

* * * * *